United States Patent [19]

Otokawa et al.

[11] Patent Number: 5,004,965
[45] Date of Patent: Apr. 2, 1991

[54] BRUSHLESS MOTOR WITH TORQUE COMPENSATION

[75] Inventors: Mitsuhiro Otokawa; Hiroyuki Takimoto, both of Yokohama, Japan

[73] Assignee: Canon Kabushiki Kaisha, Tokyo, Japan

[21] Appl. No.: 195,647

[22] Filed: May 18, 1988

[30] Foreign Application Priority Data

May 20, 1987 [JP] Japan .................. 62-121150
May 20, 1987 [JP] Japan .................. 62-121151
May 20, 1987 [JP] Japan .................. 62-121153

[51] Int. Cl.[5] ........................................... H02P 6/02
[52] U.S. Cl. ................................. 318/254; 318/138
[58] Field of Search ............... 318/138, 254, 310, 311, 318/312, 314, 315, 318, 326, 327, 328, 439

[56] References Cited

U.S. PATENT DOCUMENTS

| 4,317,072 | 2/1982 | Goof et al. | 318/254 X |
|---|---|---|---|
| 4,348,621 | 9/1982 | Hyldal | 318/254 |
| 4,486,692 | 12/1984 | Sonoda et al. | 318/327 X |
| 4,507,590 | 3/1985 | Miyazaki | 318/254 |
| 4,538,096 | 8/1985 | Kern | 318/327 X |
| 4,546,294 | 10/1985 | Ban et al. | 318/318 X |
| 4,578,606 | 3/1986 | Welterlin | 318/254 X |
| 4,595,865 | 6/1986 | Jahns | 318/254 |
| 4,651,067 | 3/1987 | Ito et al. | 318/254 |
| 4,672,274 | 6/1987 | Suganuma | 318/254 |
| 4,680,515 | 7/1987 | Crook | 318/254 X |

FOREIGN PATENT DOCUMENTS

| 58-107058 | 6/1983 | Japan | 318/254 |
|---|---|---|---|
| 61-88755 | 5/1986 | Japan | 318/254 |
| 61-92150 | 5/1986 | Japan | 318/254 |
| 62-23386 | 1/1987 | Japan | 318/254 |
| 63-287386 | 11/1988 | Japan | 318/254 |
| 63-287388 | 11/1988 | Japan | 318/254 |

Primary Examiner—Bentsu Ro
Attorney, Agent, or Firm—Fitzpatrick, Cella, Harper & Scinto

[57] ABSTRACT

There is disclosed a brushless motor provided with a speed detector for detecting the rotating speed of rotor; a synthesizer for synthesizing the output wave forms of inverse electromotive force of different phases of the brushless motor; a detector for detecting the synthesized wave form from the synthesizer; an inverter for inverting the detected wave form from the detector; an oscillator for generating a predetermined frequency; a frequency divider for dividing the frequency from the oscillator according to the output from the inverter; a counter for counting the clock output signal from the frequency divider, latching the count in a cycle of a signal from the speed detector and resetting the count; and a drive controller for generating a control voltage in response to the output from the counter thereby controlling the current supplied to the rotor.

3 Claims, 7 Drawing Sheets

BRUSHLESS MOTOR WITH TORQUE COMPENSATION

BACKGROUND OF THE INVENTION

1. Field of the Invention

The present invention relates to a brushless motor, and more particularly to a device with a digital servo circuit for appropriately controlling the output torque.

2. Related Background Art

Figure 1:
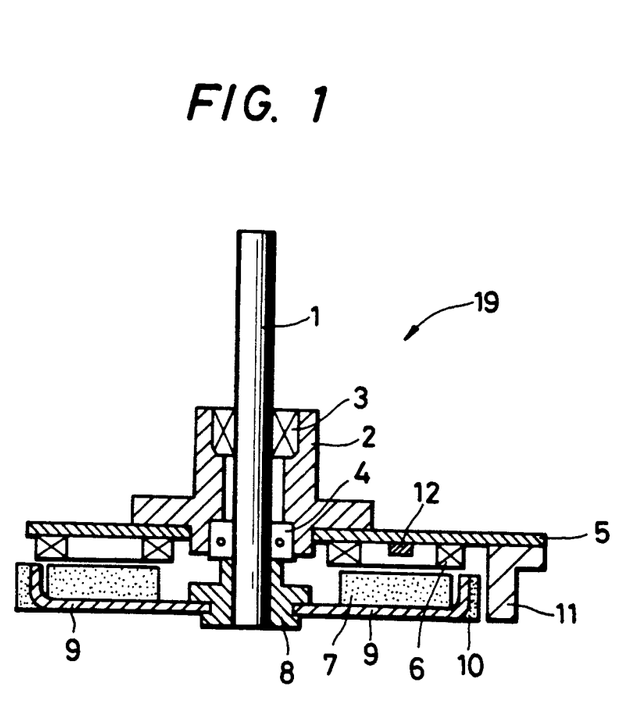
FIG. 1 is a cross-sectional view of a flat brushless motor.

FIG. 1 is a cross-sectional view showing an example of the brushless motor. There is shown a capstan motor as an example, in which a rotary shaft 1 is supported by a metal bearing 3 and a ball bearing 4. 2 indicates a bearing housing. Plural spiral coils 6 are arranged on a stator yoke 5, facing a multi-pole magnet 7 fixed on a rotor yoke 9.

The multi-pole magnet 7 is connected to the rotary shaft 1 through a bushing 8 and the rotor yoke 9 and is therefore rendered rotatable. An FG (frequency generation) magnet 10 is formed by ultra multi-pole magnetization of a small pitch on the outer periphery of the rotor yoke 9. A magnetic resistance element 11, serving as a magnetic detector, generates FG pulses according to the rotation of the rotary shaft 1, in combination with the FG magnet 10. The pulse width becomes shorter or longer as the rotation speed increases or decreases. A Hall device 12 detects the phase of the multi-pole magnet 7, and constitutes a part of the system for switching the current supply to the coils 6. A numeral 19 indicates the brushless motor to be controlled.

Figures 2A, 2B:
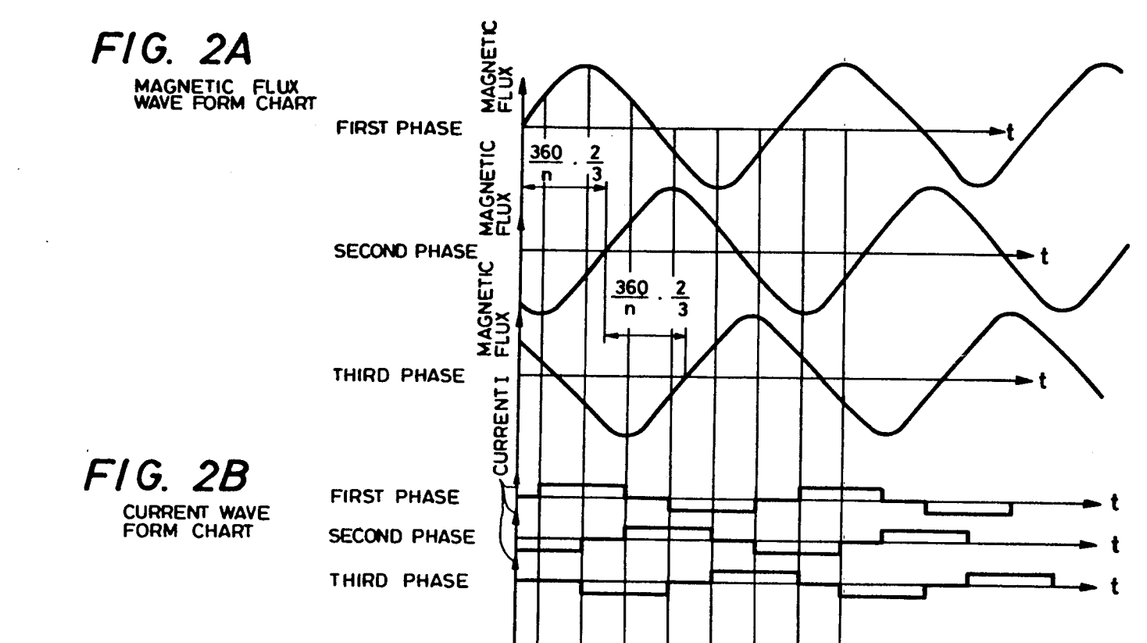
FIGS. 2A, 2B and 2C are time charts showing variation in magnetic flux, current and torque in a brushless motor.
Figure 2C:
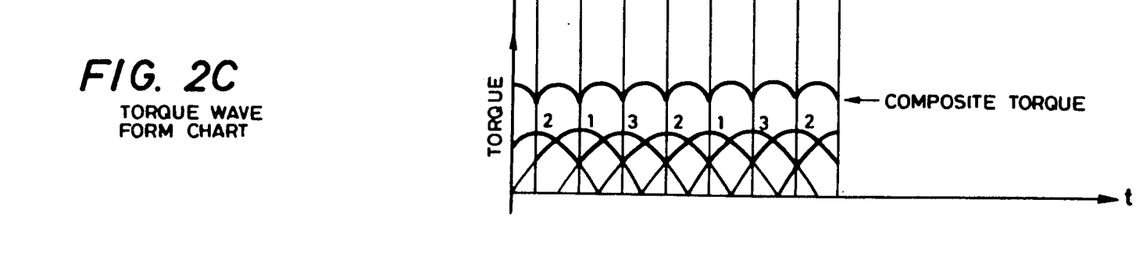

FIGS. 2A, 2B and 2C are charts showing the variation in torque generated by a brushless motor. In case of a three-phase brushless motor, the magnetic flux distribution in the coil generally assumes a sinusoidal form as shown in FIG. 2A. For magnetic poles of a number n, the coils of different phases are mutually displaced by $(1.360/n)°$ on the stator yoke 5, thereby generating magnetic flux changes of three phases.

The above-mentioned fact and the current supply to the coils 6 of different phases at the timings shown in FIG. 2B depending on the outputs of Hall devices give rise to a torque as shown in FIG. 2C, involving a torque ripple. Consequently the rotary shaft 1 shows uneven rotation.

The unevenness in rotation speed $\Delta N$ and the torque ripple T are mutually related as follows:

$$\Delta N \propto \frac{T}{N^2 \cdot J}$$

wherein J is the inertia of the rotating parts, and N is the rotation speed. The uneven rotation caused by such torque ripple is particularly marked in a capstan motor where the rotation speed is very low, so that magnetic recording and/or reproducing apparatus employing such brushless motor have resulted in wow or flutter in audio signal or jitter in the video signal. An increase in the inertia J, which has been employed as the measure for resolving this drawback, has been a serious obstacle in reducing the weight of the motor or of equipment utilizing such motor.

SUMMARY OF THE INVENTION

In consideration of the foregoing, the object of the present invention is to reduce or almost eliminate the torque ripple leading to the uneven rotation thereby improving the rotating performance of the motor, and opening wide possibility for weight reduction of such motor.

BRIEF DESCRIPTION OF THE DRAWINGS

FIGS. 10 to 12 illustrate a third embodiment of the present invention, wherein;

DETAILED DESCRIPTION OF THE PREFERRED EMBODIMENTS

Now the present invention will be clarified the following detailed description of the embodiments thereof shown in the attached drawings.

Figure 3:
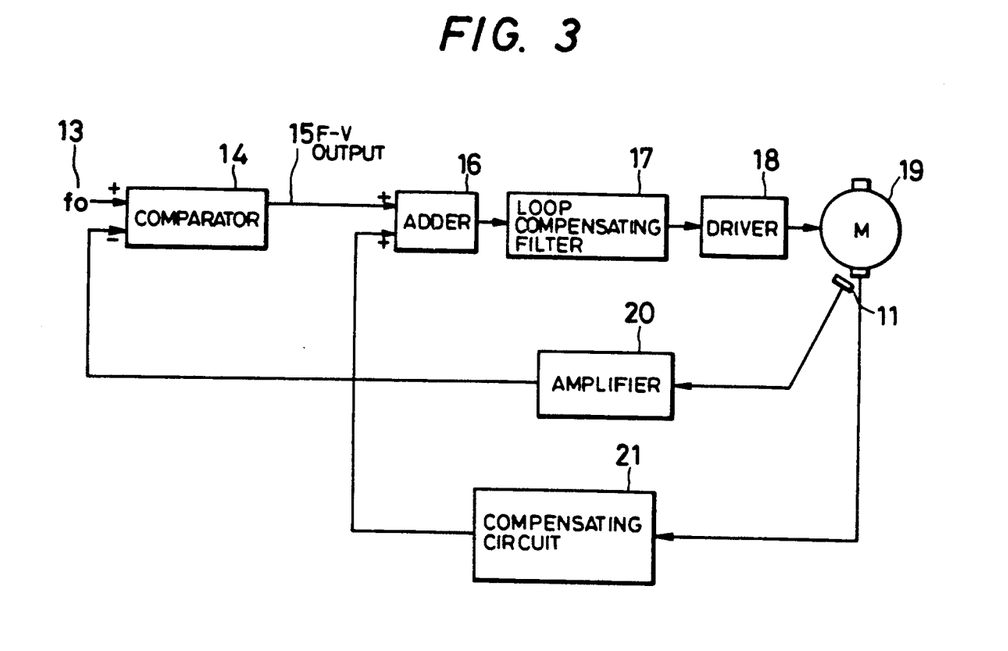
FIG. 3 is a block diagram of an apparatus embodying the present invention.

FIG. 3 is a block diagram of an apparatus constituting a first embodiment of the present invention. A reference pulse signal 13, representing predetermined information of target rotation speed of a motor 19, is generated by a certain device (not shown). A comparator 14 compares said reference signal 13 with an FG pulse signal supplied from a magnetic resistance device 11 through an amplifier 20, and generates a voltage linked with the difference in rotation speed in a predetermined relationship. The FG pulse signal functions as a detector for negative feedback. An output signal 15, obtained by frequency-voltage (F-V,) conversion, is used for controlling the rotation speed of the motor 19 in a control loop illustrated in FIG. 3.

There are also provided an adder 16 for adding an output supplied from the motor 19 through a compensating circuit 21 to be explained later and the F-V output 15; a compensating filter 17 for determining the response of the loop; and a driver 18 for varying the current supplied to the motor 19 in response to the input voltage.

In the following there will be explained the details and function of the compensating circuit 21 with reference to FIGS. 4 to 7.

Figure 5:
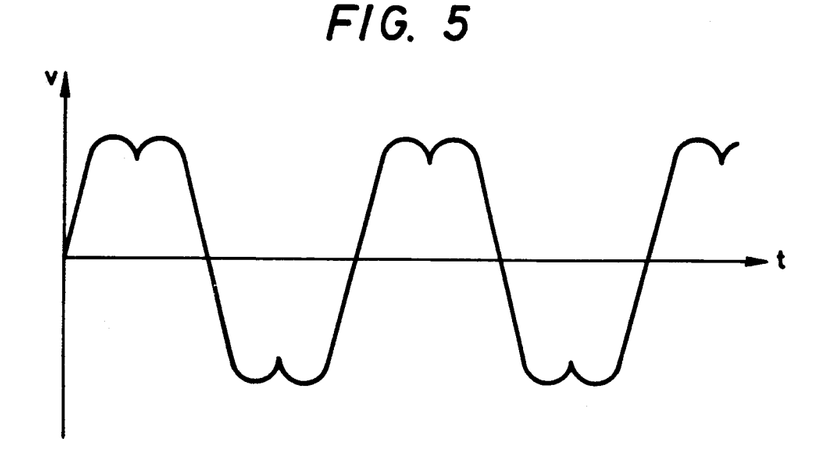
FIGS. 5 to 7 are wave form charts respectively showing an inverse electromotive force, mixed and detected wave forms, and an inverted wave form in various parts shown in FIG. 4.

FIG. 5 shows the wave form of the inverse electromotive force generated in the coil of the first phase.

As shown in FIG. 2C, the wave form of the synthesized torque under a constant current has a frequency component which is six times as large as the frequency of the magnetic flux. The generated torque is represented by the torque coefficient times the coil current, in which the coil current is constant while the generated synthesized torque has the above-mentioned property, so that the torque coefficient has a frequency component which is six times as large as the frequency of magnetic flux change.

On the other hand the inverse electromotive force is represented by the inverse electromotive coefficient times the revolution, so that the inverse electromotive coefficient and the torque coefficient are represented as the products of same factors such as field magnetic flux or number of poles and certain constants.

From the foregoing it will be understood that the wave form of inverse electromotive force generated in the rotation, of the brushless motor 19 contains a frequency component which is the same a that of the wave form of synthesized torque (composite torque), as shown in FIG. 5.

Figure 4:
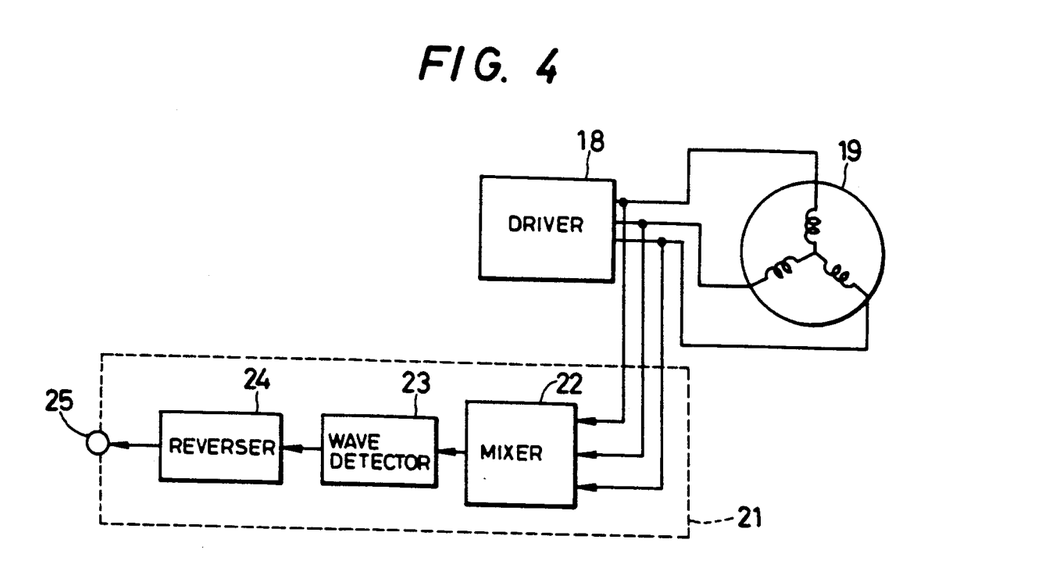
FIG. 4 is a block diagram showing the details of a compensating circuit shown in FIG. 3.

FIG. 4 shows the detailed structure of the compensating circuit 21, driver 18 and motor 19 shown in FIG. 3, wherein the compensating circuit 21 is used for generating a compensating signal for cancelling the ripple in the torque, based on the above-described wave form of three-phase inverse electromotive force.

The driver 18 switches the currents supplied to the coils of the motor 19 in response to the output signals of Hall devices 12 (FIG. 1) incorporated in said coils, thereby inducing rotation of the motor 19. Said rotation generates the inverse electromotive forces shown in FIG. 3 in the coils of different phases.

Figure 6:
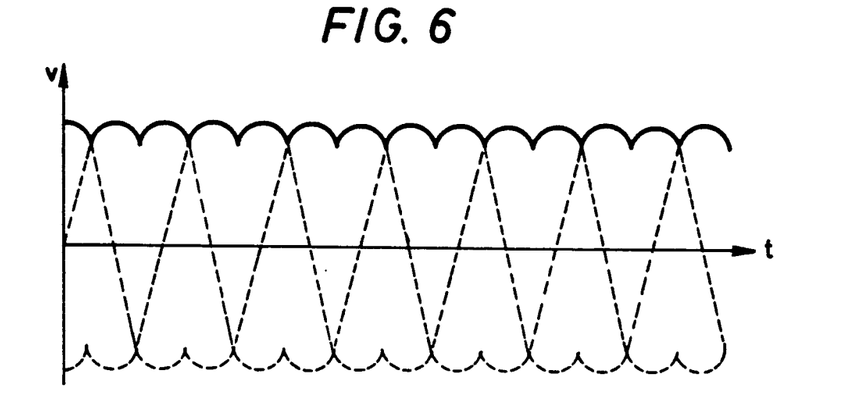

The wave forms of three phases are mixed in a mixer 22 (FIG. 4) and the mixed wave form is demodulated in the detector 23. In FIG. 6 a wave form shown by solid and broken lines is the mixed wave form, while that shown by the solid line is the demodulated wave form. The demodulated output is inverted by a reverser 24 (FIG. 4) to generate the compensating signal 125, as shown in FIG. 7, for cancelling the torque ripple.

Figure 7:
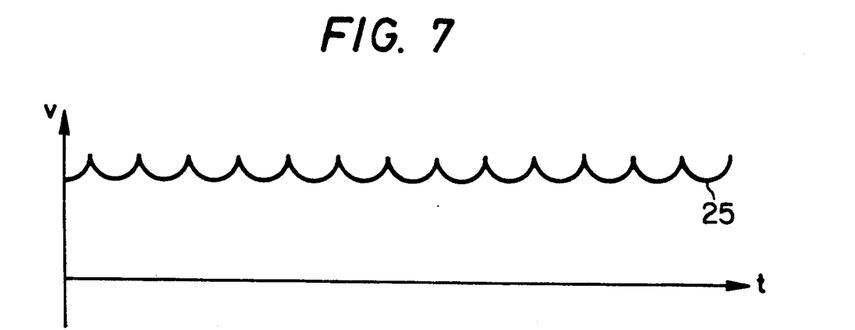

As explained in the foregoing, the output signal of the adder 16 obtained by adding the F-V output signal 15 and the compensating signal 25 from the compensating circuit 21 eventually reaches the driver 18, so that current supplied from the driver 18 to the motor 19 contains an inverted frequency component 25 as shown in FIG. 7.

Consequently the ripple in the generated synthesized torque is compensated in advance by the frequency component in the current supplied to the coils.

A same effect can be obtained also by adding the compensating signal 25 to the power supply voltage for the comparator 14. As will be apparent from the foregoing explanation, it is rendered possible to reduce the ripple in the torque by the feedback of coil currents generated from the inverse electromotive force of the motor and having a wave form for cancelling the torque ripple. In this manner there are obtained an effect of reducing the unevenness in the rotation of the motor, and a large possibility for weight reduction of the motor through a reduction in the rotational inertia.

Figure 8:
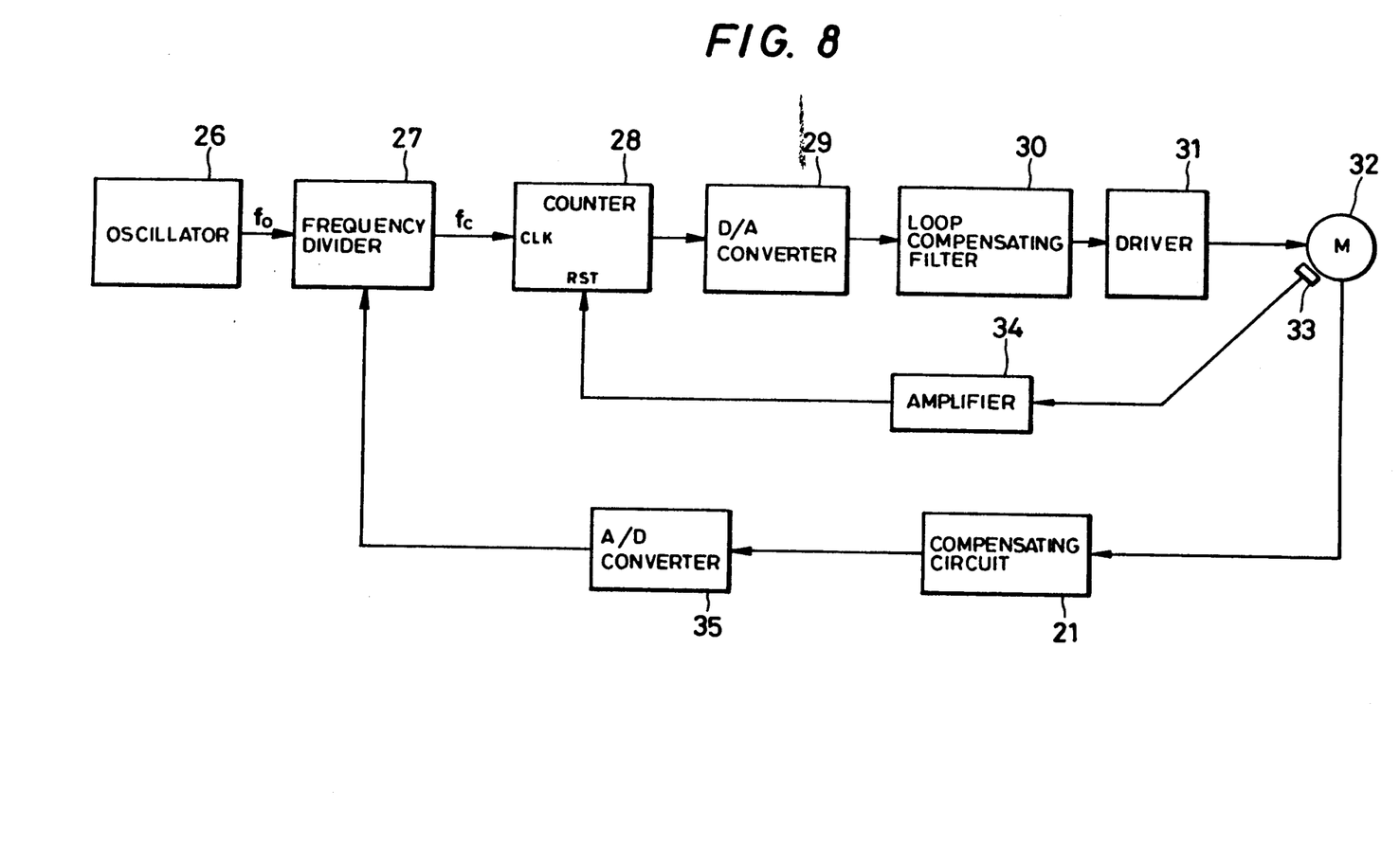
FIG. 8 is a block diagram of a second embodiment of the present invention.

FIG. 8 is a block diagram of another embodiment of the present invention, wherein shown are an oscillator 26; a frequency divider 27 for dividing the frequency oscillated by said oscillator 26, with a frequency dividing ratio which is variable, according to the level of an output supplied through an A/D (analog to digital) converter 35 of the compensation circuit to be explained later; and a counter 28 for counting the pulses from the frequency divider 27 and providing an overflow signal at a predetermined pulse count, and being reset at the upshift edge of the FG pulse supplied from an magnetic resistance device 33 through the amplifier 34 or of said overflow signal.

There are further provided a D/A (digital to analog) converter 29; a compensating filter 30 for eliminating the high frequency components of the output of the D/A converter 29 or determining the response of a motor control loop shown in FIG. 8; and a driver 31 for selecting the supply current to the motor 32 according to the input voltage from the compensating filter 30.

The compensating circuit 21 shown in FIG. 8 is the same as that in the foregoing embodiment shown in FIG. 4.

The control system of the embodiment shown in FIG. 8 also generates, in the rotation of the motor, an inverse electromotive forces shown in FIG. 5.

The structure of the compensating circuit, the driver 31 and the motor in the foregoing embodiment shown in FIG. 4 is also applicable to the present second embodiment, and the compensating circuit 21 is used for generating a compensating signal for cancelling the ripple in the torque by the wave form of inverse electromotive forces of three sets as described above.

The driver 31 switches the currents to the coils the motor 32 according to the output signals from the Hall devices 12 incorporated in said coils, thereby inducing rotation of the motor 32. Said rotation generates inverse electromotive forces in the coils as shown in FIG. 5.

Said three wave forms are mixed in the adder 22, and the mixed wave form is demodulated by the detector 23. In FIG. 6, a wave form shown by solid and broken lines is the mixed wave form, while that shown by the solid line is the demodulated wave form. The demodulated output is inverted by the reverses (FIG. 4) 24 to generate the compensating signal 25, as shown in FIG. 7, for cancelling the torque ripple.

Figure 9:
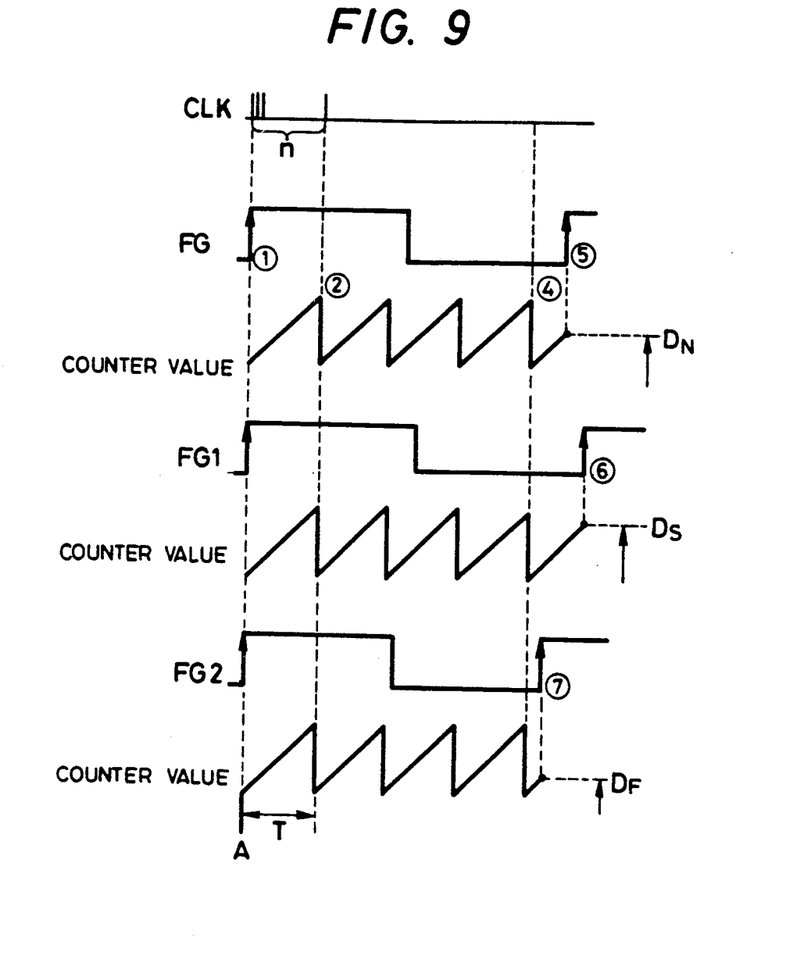
FIG. 9 is a timing chart of the circuit shown in FIG. 8.

In the following there will be given a detailed explanation on the function of the counter 28, while making reference to a timing chart shown in FIG. 9. The counter 28 is reset at the upshift edge of the FG pulse signal supplied from the magnetic resistance device 33 through the amplifier 34 and corresponding to the rotation speed of the motor 32 (time (1)), thus starting the counting operation Thereafter, upon entry of pulses of a predetermined number n from the frequency divider 27, the counter overflows and is reset again (time (2)). Thereafter the overflow process is repeated four times (time (4)), and the count $D_N$ is latched and released at the leading edge of the next FG pulse (time (5)).

The time $T = n/fc$ represents the gain of the control loop and is suitably set according to the loop. If the count $D_n$ corresponds to the target revolution of the motor 32, the latch output is preferably equal to $D_N = n/2$.

When the rotation speed of the motor 32 becomes slightly lower than the target revolution, pulses FG1 are entered to provide a count $D_S$ (time (6)) larger than $D_N$. On the other hand, when the rotation speed of the motor becomes slightly higher than the target rotation speed, pulses FG2 are entered to provide a count $D_F$ smaller than $D_N$. Consequently the latched output of the counter 28 varies inversely to the change of the rotation speed of the motor 32.

Thus the rotation speed of the motor 32 is maintained constant by a closed loop involving the above-described counter 28. In the following there will be explained said rotation speed control and the compensation of the torque ripple of the present invention.

The output at the output terminal of the compensating circuit 21 shown in FIG. 4 is converted by the A/D converter 35 into a digital signal. The high-value state of said digital signal corresponds to a generated torque lower than the target value. Consequently the frequency divider 27 reduces the frequency dividing ratio to provide an output frequency fc+Δf, wherein fc is the frequency of pulses released from the frequency divider 27 corresponding to a state of target torque without ripple. In response to the clock signal of a frequency larger than fc, the counter 28 latches a correspondingly larger value if the revolution of the motor 32 is constant. Thus a higher voltage is supplied to the motor to increase the current, thereby increasing the generated torque.

On the other hand, when the generated torque is higher than the target value, the output of the A/D converter 35 decreases. Thus the frequency divider 27 increases the frequency dividing ratio whereby the clock signal of a frequency of fc−Δf is given to the counter 28. Consequently the pulse duration of the clock signal becomes longer and the latched output becomes smaller than in the case of fc, thereby reducing the supply voltage and decreasing the generated torque.

As explained in the foregoing, it is rendered possible to reduce the ripple in torque by varying the frequency of a clock signal in a digital servo system at the phase of such torque ripple. In this manner there are obtained effects of reducing the unevenness in the rotation of motor, and of weight reduction of the motor through a reduction in the rotational inertia.

Figure 10:
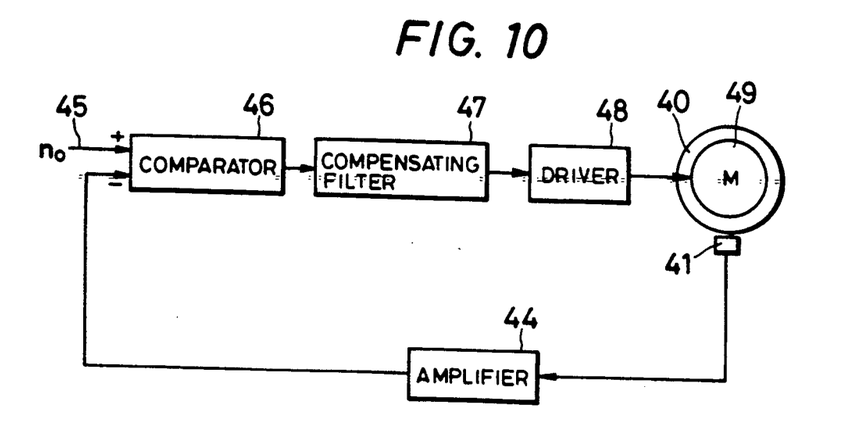
FIG. 10 is a block diagram of an apparatus embodying the present invention.
Figure 11:
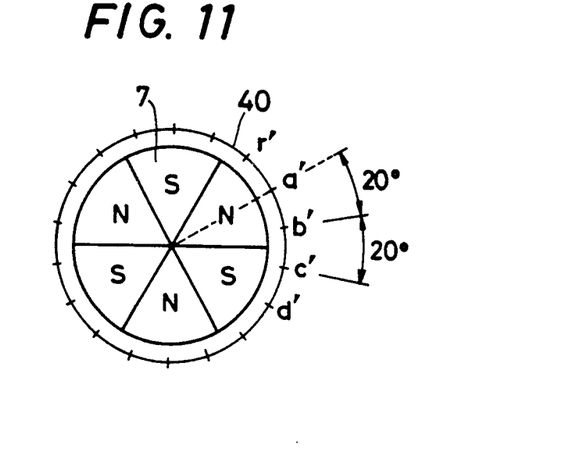
FIG. 11 is a plan view showing a multi-pole magnet and an FG magnet employed in said third embodiment of the present invention.
Figure 12A:
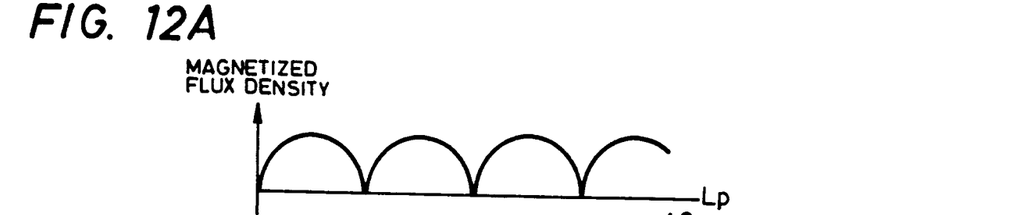
FIGS. 12A, 12B and 12C are waveforms and a diagram of an FG magnet showing the mode of magnetization of the FG magnet shown in FIG. 11 and the advantages thereof.
Figure 12B:
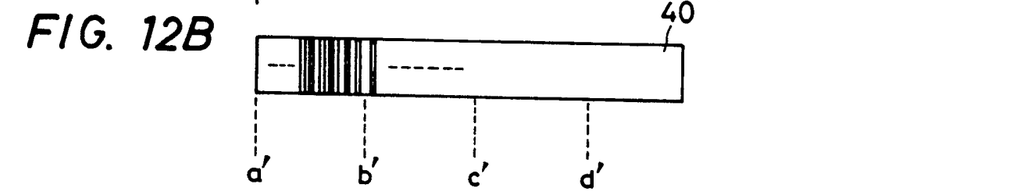
Figure 12C:
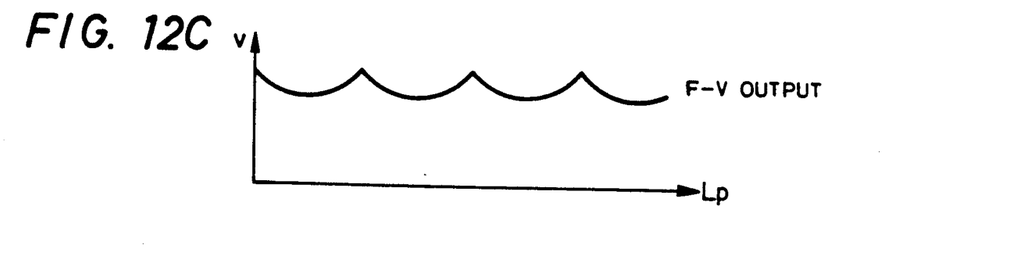

FIGS. 10 to 12 show a third embodiment for reducing the torque ripple of a motor, comprising speed detecting means provided at a predetermined position of a rotary member and non-linearly detecting the speed of said rotary member; comparator means for comparing a predetermined rotating speed with the speed detected by said speed detecting means and providing a voltage corresponding to the difference of speeds obtained by said comparison; and drive control means for controlling the current supplied to said rotary member according to the voltage from said comparator means.

In the above-explained structure, the pitch of magnetization of the FG magnet is made correspond to the displacement of the torque ripple, whereby the detected speed corresponds to the torque ripple so that the torque ripple can be reduced.

In the following this embodiment will be explained further, with reference to FIGS. 10 to 12.

FIG. 10 is a block diagram of a control system involving the apparatus of the present invention, wherein shown are the aforementioned FG magnet 40 and magnetic resistance device 41, and a brushless motor 49 to be controlled. A reference pulse signal 45 representing the target rotation speed of the motor 49 is generated by a predetermined device. A comparator 46 compares said reference pulse signal 45 with an FG pulse signal supplied from the magnetic resistance device 41 through an amplifier 44, and produces a voltage converted from the difference in rotation according to a predetermined relation. The FG pulse signal is used as factor for negative feedback. There are also provided a compensating filter 47 for determining the response of the loop, and a driver 48 for varying the current supplied to the motor 49 according to the input voltage.

FIG. 11 is a plan view of a multi-pole magnet and an FG magnet embodying the present invention. In the present embodiment, the multi-pole magnet 7 has 6 poles, while the FG magnet 40 has 360 poles.

In this case, the number of torque ripples per rotation of the rotary shaft 1 of the motor 49 (FIG. 10) is 6 (poles) ×3 (phases)=18. Thus a cycle of torque ripple is divided into 18 points t=a, b, c, ..., r.

It is now assumed that, at a time t=a, as shown in FIG. 11, the multi-pole magnet 7 and the FG magnet 40 are at the broken lined position a' of the coil of the first phase. Thus the positions b', ..., r, respectively correspond to t=b, ... r. Thus the period of each torque ripple ab, bc, ..., or qr shown in FIG. 2C respectively correspond to a section a'b', b'c', ... or q'r' in FIG. 11.

Since the FG magnet has 360 poles for 18 ripples, there exist 20 poles in each of the sections ab, bc, ..., qr. The pitch of magnetization of said 20 poles is selected according to the wave form of the torque ripple shown in FIG. 2C.

FIGS. 12A, 12B and 12C show the mode of said magnetization, and the F-V output from the comparator 46. FIG. 12B is a developed view of the FG magnet 40, and FIG. 12A shows the peripheral length Lp in the abscissa and the magnetized flux density in the ordinate. As will be understood from these drawings and FIG. 12C, the density of magnetization is regulated coarse and dense corresponding to the torque ripple, denser at the position of higher torque and coarse at the position of lower torque.

Therefore, corresponding to the "low-high-low" distribution of the torque ripple, the FG-pulses from the magnetic resistance device 41 indicate "slower-faster-slower" revolution in comparison with the target revolution, so that the voltage from the comparator 16 shows a "high low-high" change as shown in FIG. 12C, and the supply current to the motor coil shows a change of "high-low-high".

In this manner the supply current is varied to compensate the variation in torque, thereby reducing the torque ripple.

As explained in the foregoing, a pitch of magnetization of the FG magnet corresponding to the change in the torque ripple enables speed detection corresponding to the torque ripple, thereby reducing the torque ripple of the motor. There are thus obtained an effect of reducing the unevenness in the rotation of motor, and a large possibility for weight reduction of the motor through a reduction in the rotational inertia.

We claim:
1. In a brushless motor which includes a rotor, comprising:
   speed detecting means for detecting the rotating speed of said rotor;
   synthesizing means or synthesizing the output wave forms of inverse electromotive forces of different phases of the brushless motor and outputting a synthesized wave form;
   detector means for demodulating the synthesized wave form obtained from said synthesizing means and outputting a demodulated wave form;
   inverter means for inverting the demodulated wave form from said detector means and outputting it;
   comparator means for comparing a predetermined rotation speed with the speed detected by said speed detecting means and generating a voltage corresponding to the difference of speed obtained from said comparison and outputting it;

adding means for adding the output from said inverter means to the output from said comparator means and outputting it; and drive control means for controlling the current supplied to said motor according to the output from said adding means.

2. In a brushless motor which includes a rotor, comprising:

speed detecting means for detecting the rotating speed of said rotor and outputting it;

synthesizing means for synthesizing the output wave forms of inverse electromotive forces of different phase of the brushless motor and outputting a synthesized wave form;

detector means for demodulating the synthesized wave form obtained from said synthesizing means and outputting it;

inverter means for inverting the demodulated wave form from said detector means and outputting it;

oscillator means for generating a predetermined frequency signal;

frequency divider means for dividing the predetermined frequency signal from said oscillator means according to the output from said inverter means;

counter means for counting the output from said frequency divider means as clock signals, latching the count in the counter means when a predetermined signal is entered from said speed detecting means, and simultaneously resetting the count value; and drive control means for controlling the current supplied to said motor, according to the output from said counter means.

3. In a brushless motor comprising:

speed detecting means for non-linearly detecting a speed of a rotor, said speed detecting means including a speed detecting magnet having magnetic poles for a frequency generator and provided on a periphery of said rotor, and a magnetic resistance device for detecting magnetic fields of said magnetic poles, said magnetic poles being spaced from each other in accordance with a pattern of torque ripple, denser at the position of higher torque and coarse at the position of lower torque;

comparator means for comparing a predetermined rotating speed with the speed detected by said speed detecting means and converting the difference between said speeds obtained by the comparison into a voltage value corresponding to the difference between said speeds, and outputting the voltage value; and drive control means for controlling current supplied to the motor on the basis of the voltage value from said comparator means.

* * * * *

UNITED STATES PATENT AND TRADEMARK OFFICE
CERTIFICATE OF CORRECTION

PATENT NO. : 5,004,965

DATED : April 2, 1991

INVENTOR(S) : Mitsuhiro Otokawa et al.

It is certified that error appears in the above-identified patent and that said Letters Patent is hereby corrected as shown below:

COLUMN 1:

Line 58, "audio signal" should read --the audio signal--.

COLUMN 2:

Line 37, "clarified "should read --clarified by--;
    Line 51, "frequency-voltage (F-V,)" should read --frequency-voltage (F-V)--.

COLUMN 3:

Line 8, "hand" should read --hand,--;
    Line 16, "rotation," should read --rotation--;
    Line 38, "compensating signal 125," should read compensations signal 25,--.

COLUMN 4:

Line 4, "an" should read --a--;
    Line 26, "coils" should read --coils of--;
    Line 36, "reverses" should read --reverser-- and "(FIG. 4) 24" should read --24 (FIG. 4)--;
    Line 58, "revolution" should read --rotation speed--.

UNITED STATES PATENT AND TRADEMARK OFFICE
CERTIFICATE OF CORRECTION

PATENT NO. : 5,004,965            Page 2 of 2
DATED      : April 2, 1991
INVENTOR(S): Mitsuhiro Otokawa et al.

It is certified that error appears in the above-identified patent and that said Letters Patent is hereby corrected as shown below:

COLUMN 5:

Line 46, "correspond" should read --to correspond--;
    Line 65, "factor" should read --a factor--.

COLUMN 6:

Line 12, "positions b',..., r," should read --positions b',..., r',--;
    Line 55, "or" should read --for--.

COLUMN 7:

Line 13, "phase" should read --phases--.

Signed and Sealed this

Twenty-second Day of December, 1992

Attest:

DOUGLAS B. COMER

*Attesting Officer*     *Acting Commissioner of Patents and Trademarks*